United States Patent
Huber et al.

(10) Patent No.: US 11,378,585 B2
(45) Date of Patent: Jul. 5, 2022

(54) METHOD AND DEVICE FOR DETERMINING A SPEED BY MEANS OF AN INDUCTIVE SPEED SENSOR

(71) Applicant: KNORR-BREMSE SYSTEME FUER NUTZFAHRZEUGE GMBH, Munich (DE)

(72) Inventors: Christoph Huber, Munich (DE); Andre Kluftinger, Kleinheubach (DE); Markus Eissner, Eschenbach (DE); Michael Herges, Munich (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 171 days.

(21) Appl. No.: 16/965,591

(22) PCT Filed: Jan. 28, 2019

(86) PCT No.: PCT/EP2019/051968
§ 371 (c)(1),
(2) Date: Jul. 28, 2020

(87) PCT Pub. No.: WO2019/154654
PCT Pub. Date: Aug. 15, 2019

(65) Prior Publication Data
US 2021/0364544 A1 Nov. 25, 2021

(30) Foreign Application Priority Data
Feb. 9, 2018 (DE) ...................... 10 2018 001 059.8

(51) Int. Cl.
*G01P 3/481* (2006.01)
*G01P 13/04* (2006.01)

(52) U.S. Cl.
CPC ............ *G01P 3/481* (2013.01); *G01P 13/045* (2013.01)

(58) Field of Classification Search
CPC ........ G01P 3/481; G01P 13/045; G01P 13/04; G01P 3/488
See application file for complete search history.

(56) References Cited

U.S. PATENT DOCUMENTS 3,855,525 A    12/1974   Bemin
5,446,375 A *   8/1995   Perkins .................. G01P 3/488
                                                      327/516

(Continued)

FOREIGN PATENT DOCUMENTS

CN      1712970 A    12/2005
CN    104870275 A    8/2015
(Continued)

OTHER PUBLICATIONS

International Search Report for PCT/EP2019/051968, dated Dec. 11, 2019.

*Primary Examiner* — Alvaro E Fortich
*Assistant Examiner* — Zannatul Ferdous
(74) *Attorney, Agent, or Firm* — Norton Rose Fulbright US LLP; Gerard Messina (57) ABSTRACT

A method for determining a speed between a measurement-sensor, including at least one coil and a ferromagnetic-transmitter-element (FEM), including: changing the inductance of the coil and the voltage induced therein, in a vehicle using an inductive-speed-sensor having at least the coil and FEM; recording the inductance-change of the coil, and determining the speed based on the changed-inductance; in which the inductance-change is recorded and the speed is determined based on the changed-inductance only until the determined-speed has reached a speed-limit-value (SLV) starting from lower-speeds, in which a voltage-change (Continued)

induced in the coil is recorded and the speed is determined based on the changed-voltage when the determined-speed has exceeded the SLV starting from lower-speeds, and in which an inductance-change is recorded and the speed is determined based on the changed-inductance when the determined-speed has reached/dropped below the SLV starting from higher-speeds. Also described are a related driver assistance system and vehicle.

19 Claims, 3 Drawing Sheets

(56) References Cited

U.S. PATENT DOCUMENTS

| | | | |
|---|---|---|---|
| 5,539,308 A * | 7/1996 | Teramae | G01P 3/481 361/239 |
| 6,429,658 B1 | 8/2002 | Thomsen et al. | |
| 8,965,691 B1 | 2/2015 | Lombrozo | |
| 2003/0176932 A1 * | 9/2003 | Wild | G01P 3/488 700/74 |
| 2005/0083041 A1 | 4/2005 | Schwartzbart | |
| 2010/0117628 A1 | 5/2010 | Schunk et al. | |
| 2015/0057878 A1 | 2/2015 | Friel et al. | |

FOREIGN PATENT DOCUMENTS

| | | |
|---|---|---|
| CN | 106796118 A | 5/2017 |
| CN | 107429723 A | 12/2017 |
| DE | 4130168 A1 | 3/1993 |
| DE | 10146949 A1 | 6/2002 |
| DE | 10131453 A1 | 1/2003 |
| DE | 102005016110 A1 | 10/2006 |
| DE | 102007036202 A1 | 5/2009 |
| DE | 102008056700 A1 | 6/2010 |
| DE | 102012224098 A1 | 6/2014 |
| DE | 202016000534 U1 | 5/2016 |
| EP | 0665437 A1 | 8/1995 |
| EP | 2284544 A1 | 2/2011 |
| JP | S59132307 A | 7/1984 |
| JP | H0352586 A | 3/1991 |
| WO | 2009100885 A1 | 8/2009 |
| WO | 2014/095311 A1 | 6/2014 |
| WO | 2015/025227 A2 | 2/2015 |

* cited by examiner

METHOD AND DEVICE FOR DETERMINING A SPEED BY MEANS OF AN INDUCTIVE SPEED SENSOR

FIELD OF THE INVENTION

The invention relates to a method for determining a speed between a measurement sensor comprising at least one coil and a ferromagnetic transmitter element, changing the inductance L of the at least one coil and the voltage U induced in the at least one coil, in a vehicle using an inductive speed sensor having at least the coil and the ferromagnetic transmitter element, and to a speed measurement device for determining a speed between a measurement sensor comprising at least one coil and a ferromagnetic transmitter element, changing the inductance of the at least one coil and the voltage U induced in the at least one coil, in a vehicle, which speed measurement device has at least one inductive speed sensor. The invention furthermore also relates to a driver assistance system having such a speed measurement device, and also to a vehicle having such a driver assistance system.

BACKGROUND INFORMATION

Patent document DE 101 46 949 A1 discusses an active speed sensor as wheel speed sensor in which a ferromagnetic or permanent-magnet encoder, as transmitter element, rotates in front of a magnetoresistive element as measurement sensor. The measurement sensor is connected as a bridge in a bridge circuit, wherein the bridge voltage dropped across the measurement sensor is modulated by the rotating encoder and evaluated by an evaluation circuit. Such a magnetoresistive element may be formed for example by a Hall element. In the case of magnetoresistive speed sensors having magnetoresistive measurement sensors, the amplitude of the signal from the measurement sensor does not depend on the speed. Magnetoresistive speed sensors are therefore able to record a speed from a standstill up to a maximum speed.

According to WO 2014/095311 A1, which forms part of the genre, only silicon comes into consideration at present for magnetoresistive speed sensors in the automotive sector for cost reasons, as a result of which the operating temperature of the magnetoresistive speed sensors supposedly has an upper limit, depending on the technology, of 150° C. to 200° C. In motor vehicles, however, there are higher peak temperatures for speed sensors at some usage locations, these being able to be covered up until now only using inductive speed sensors. There is furthermore supposedly a disadvantage with semiconductor-based magnetoresistive speed sensors that is not caused by their principle but rather by the way in which the solution is industrialized. Since the signal processing circuits, which could be configured in the form of ASICs, would have to be very inexpensive, this only supposedly being possible through mass production, it is assumed that it is not possible to adapt this to the respective application in a vehicle. All speed sensors of one type operate with the same upper frequency limit, above which the measured signal from the measurement sensor is supposedly attenuated by the low-pass filtering. For certain applications, the limit set by the mass market is however in some cases presumably too low.

Patent document DE 41 30 168 A1 discusses a passive inductive speed sensor as motor speed sensor in which a ferromagnetic encoder, configured as transmitter element, rotates in front of a coil, configured as measurement sensor, with a fully or partly permanent-magnet core as yoke. The arrangement acts as a generator. A generator voltage is induced in the coil, the frequency and amplitude of which generator voltage are proportional to the speed. In the case of inductive speed sensors, the generator voltage and the frequency thereof are proportional to the recorded speed. This leads to a situation whereby it is not possible to measure any generator voltage at a standstill. In the case of inductive speed sensors, there is therefore a lower limit speed at which the induced voltage is still specifically high enough to allow an evaluation that meets the requirements in terms of reliability and accuracy of the speed to be recorded. In the case of vehicles, if the wheel speeds are intended to be measured by inductive speed sensors, the existence of such a lower limit for the speed to be recorded is however disadvantageous, because control systems, such as driver assistance systems, that are usually present in a vehicle require the signals from the speed sensors in the form of wheel speed sensors. Many of the abovementioned functions are required at each speed to be recorded, and others are particularly important at very low speeds to be recorded, up to a standstill. Examples are hill start assist (HSA), auto hold function and traction control (TC). Inductive speed sensors however have the advantage that their manufacturing costs are lower in comparison with magnetoresistive speed sensors produced from semiconductors. They are also particularly robust. This applies to mechanical stress, to external electromagnetic fields and to the permissible temperature range.

According to the method discussed in WO 2014/095311 A1, which forms part of the genre, an inductance is therefore used as measurement sensor in a speed sensor. Unlike in an inductive speed sensor, however, the inductance used as measurement sensor is not operated as a generator. Rather, the inductance used as measurement sensor is considered in terms of its changing electrical impedance, as in a magnetoresistive speed sensor. More precisely, the method specified there comprises the steps of: applying a source voltage to the inductance, and recording a change in a measured voltage dropped across the inductance on the basis of the source voltage in order to record the change in inductance. In this case, the encoder moving past the inductance at the speed to be measured modulates the source voltage depending on this speed. A changeable measured voltage is thereby recorded as measured signal, from which the speed to be measured is derived. An AC voltage is used in this case as source voltage. The speed of the encoder is therefore not intended to have any influence on the amplitude of the measurement result, meaning that the specified method could be used independently of speed to measure the speed. However, a voltage source for the source voltage has to be provided and connected for this purpose.

The present invention by contrast is based on the object of further developing a method based on a passive inductive speed sensor for determining a speed or a speed measurement device based thereon such that said method or speed measurement device is able to be performed or produced with less outlay. A driver assistance system having at least one such speed measurement device and a vehicle having such a driver assistance system are also likewise intended to be provided.

According to the invention, this object may be achieved by the features of the embodiments as described herein.

SUMMARY OF THE INVENTION

The invention is based on using only passive inductive speed sensors for speed measurement in the method and the speed measurement device, owing to the advantages described above in terms of manufacturing costs and robustness.

The invention is then based, according to one aspect, on a method for determining a speed between a measurement sensor comprising at least one coil and a ferromagnetic transmitter element, changing the inductance L of the at least one coil and a voltage U induced in the at least one coil, using an inductive speed sensor having at least the coil and the ferromagnetic transmitter element, in which method a change in the inductance L of the at least one coil is recorded and the speed is determined on the basis of the changed inductance L of the at least one coil.

As discussed in WO 2014/095311 A1, the method therefore (also) involves recording a change in the inductance L and determining the speed on the basis of the changed inductance L.

Unlike in WO 2014/095311 A1, however, the change in the inductance L of the at least one coil is recorded and the speed is determined on the basis of the changed inductance L of the at least one coil only until the speed determined through the change in the inductance L has reached a speed limit value starting from lower speeds.

If the determined speed has then exceeded the speed limit value starting from lower speeds, then by contrast a change in the voltage U induced in the at least one coil is recorded and the speed is determined on the basis of the changed voltage U.

If the determined speed has then reached or dropped below the speed limit value again starting from higher speeds, a change in the inductance L of the at least one coil is again recorded and the speed is again determined on the basis of the changed inductance L of the at least one coil.

The invention is in this case based on the fact that the inductance L of the at least one coil may be recorded through measurements that take place in quick succession at a certain sampling frequency. This sampling frequency would however have to be relatively high in the case of high speeds between the transmitter element and the measurement sensor, that is to say at speeds above the speed limit value, this however being difficult to implement for recording the inductance L of the at least one coil.

For this reason, the invention has recognized that, if the determined speed has exceeded the speed limit value, it is more expedient to record a change in the voltage U induced in the at least one coil in a conventional manner and to determine the speed on the basis of the changed voltage U. This is because, for recording the voltage U induced in the at least one coil, the sampling frequency of the measurement plays a less significant role.

On the other hand, the speed is determined on the basis of the changed inductance L of the at least one coil until the speed determined through the change in the inductance L has reached the speed limit value starting from lower speeds. Unlike in an inductive speed sensor, the coil used as measurement sensor is then not operated as a generator. Rather, the at least one coil used as measurement sensor is considered in terms of its changing electrical impedance or inductance L, as in a magnetoresistive speed sensor, with the advantage that low speeds as far as a standstill are then able to be recorded reliably. This is especially advantageous when determining wheel speeds in the context of driver assistance systems such as hill start assist (HSA), auto hold systems and traction control (TC).

The invention therefore combines the advantages of both measurement methods, in which the inductance L of the at least one coil is recorded depending on the speed, that is to say at low speeds until the speed limit value is reached, and the voltage U induced in the at least one coil is recorded at higher speeds above the speed limit value and the speed between the measurement sensor and the transmitter element is determined in each case on the basis of the respectively recorded variable—inductance L or induced voltage U.

According to one embodiment of the method, the inductance L of the at least one coil is recorded by virtue of the fact that:
a) the at least one coil is connected in a parallel or series resonant circuit and the inductance L of the at least one coil is recorded depending on the resonant frequency of the resonant circuit, or that
b) an electrical pulse is applied to the at least one coil and the inductance L of the at least one coil is recorded depending on the response of the at least one coil to the electrical pulse, or that
c) a constant frequency is applied to the at least one coil and the inductance L of the at least one coil is then recorded.

According to one development of the method, the vehicle may have a plurality of wheels each having an inductive speed sensor as wheel speed sensor on at least two wheels, wherein the presence of forward travel or reverse travel of the vehicle is determined on the basis of at least one temporal phase offset of the temporal profiles of the inductances L recorded by way of the wheel speed sensors of the at least two wheels. In other words, the presence of forward travel or reverse travel of the vehicle is determined on the basis of at least one temporal phase offset of the temporal profiles of the inductances recorded by wheel speed sensors of at least two different wheels of the vehicle.

In particular, in the method,
a) starting from recorded travel of the vehicle, at least one first temporal phase offset between first temporal profiles of the inductances recorded by the wheel speed sensors of the at least two wheels up to a recorded standstill of the vehicle may be stored, and then,
b) after recorded resumption of travel of the vehicle, at least one second temporal phase offset between second temporal profiles of the inductances L recorded by the wheel speed sensors of the at least two wheels may be recorded and compared with the at least one first temporal phase offset, and when it is established in the process that
c) the at least one second temporal phase offset has a significant deviation from the at least one first temporal phase offset, a reversal of the direction of travel from forward travel to reverse travel or from reverse travel to forward travel may be concluded, but if
d) on the other hand it is established that a merely insignificant deviation of the at least one second temporal phase offset from the at least one first temporal phase offset is present, a continuation of the direction of travel, forward travel or reverse travel, may be concluded.

The applicant in this case makes use of the effect whereby, in the case of wheel speed sensors arranged on a plurality of wheels, it may be assumed that their periodic inductance signals, due to arbitrary mounting, as seen in the circumferential direction, of the transmitter elements (encoders) and therefore of the tooth/tooth gap positions on the wheels, phase-shifted profiles of the inductances L recorded by different wheel speed sensors may always be assumed. In the case of two wheels each provided with a wheel speed sensor, the first profile of the inductance L recorded by the one wheel speed sensor therefore for example temporally leads or lags the first profile of the inductance L recorded by the one wheel speed sensor. As recognized by the applicant, this temporal lead or lag however reverses following an intermediate stop or vehicle standstill to a temporal lag or lead when the direction of travel was changed after the intermediate stop or vehicle standstill, which constitutes a significant deviation of the second temporal phase offset from the first temporal phase offset.

Concluding as to a reversal of the direction of travel from forward travel to reverse travel or from reverse travel to forward travel or concluding as to a continuation of the direction of travel, forward travel or reverse travel, may contain the method step of generating a corresponding signal that is then provided for example to a driver assistance system for further processing.

Recording the travel or the resumption of travel of the vehicle may be determined easily through a temporal change in the inductance L.

In the method, it may in particular be interpreted to be a significant deviation of the at least one second temporal phase offset from the at least one first temporal phase offset when the at least one second temporal phase offset is inverted with respect to the at least one first temporal phase offset, wherein a temporal lead of the first profile of the inductance recorded by the wheel speed sensor of a first wheel of the at least two wheels with respect to the first profile of the inductance recorded by the wheel speed sensor of a second wheel of the at least two wheels by the first temporal phase offset changes to a temporal lag of the second profile of the inductance recorded by the wheel speed sensor of the first wheel of the at least two wheels with respect to the second profile of the inductance recorded by the wheel speed sensor of the second wheel of the at least two wheels by the second temporal phase offset. While the first temporal inductance L profile of the inductance L recorded by the wheel speed sensor of the first wheel was therefore leading the first temporal inductance profile of the inductance L recorded by the wheel speed sensor of the second wheel in time, the conditions reverse after the intermediate stop or vehicle standstill since the second temporal inductance L profile of the inductance L recorded by the wheel speed sensor of the first wheel then lags the second temporal inductance profile of the inductance L recorded by the wheel speed sensor of the second wheel in time. This change from a temporal lead during the first temporal profiles of the inductance L, that is to say before the vehicle standstill or intermediate stop in time, to a temporal lag during the second temporal profiles of the inductance L therefore constitutes an indicator of a significant deviation of the at least one second temporal phase offset from the at least one first temporal phase offset.

Also in the method, a standstill of the vehicle may be recorded by virtue of the fact that a section is identified in the temporal profile of the inductance L in which the inductance L does not change and/or in which the gradient of the temporal profile of the inductance L is substantially equal to zero.

According to a further aspect of the invention, what is disclosed is a speed measurement device for determining a speed between a measurement sensor comprising at least one coil and a ferromagnetic transmitter element, changing the inductance L of the at least one coil and the voltage U induced in the at least one coil, in a vehicle, which speed measurement device has at least one inductive speed sensor that comprises at least the following:
  a) the at least one coil,
  b) the ferromagnetic transmitter element,
  c) an (electronic) evaluation circuit, wherein
  d) the (electronic) evaluation circuit is configured such that it records a change in the inductance L of the at least one coil and determines the speed on the basis of the changed inductance L of the at least one coil, wherein
  e) the evaluation circuit is furthermore configured such that it
    e1) records the change in the inductance L of the at least one coil and determines the speed on the basis of the changed inductance L of the at least one coil only until the determined speed has reached a speed limit value starting from lower speeds, but that it
    e2) records a change in the voltage U induced in the at least one coil when the determined speed has exceeded the speed limit value starting from lower speeds, and the speed is determined on the basis of the changed voltage U, and that it
    e3) records a change in the inductance L of the at least one coil when the determined speed has reached or dropped below the speed limit value starting from higher speeds, and the speed is determined on the basis of the changed inductance L of the at least one coil.

According to one development of the speed measurement device, it forms a wheel speed measurement device. By way of example, the ferromagnetic transmitter element is then configured in a ring shape and rotates together with a wheel of the vehicle coaxially with respect to the wheel axis, whereas the at least one stationary coil surrounds a soft-magnetic core and a common center axis of the at least one coil and of the soft-magnetic core is arranged parallel to the wheel axis and perpendicular to a plane that is also perpendicular to the wheel axis.

In the case of the speed measurement device, the ferromagnetic transmitter element may in particular have alternately protruding teeth and tooth gaps. In this case, a temporal profile of the inductance L of the at least one coil has a maximum when a tooth is opposite the soft-magnetic core and a minimum when a tooth gap is opposite the soft-magnetic core. This therefore results in a constant change between a minimum inductance Lmin and a maximum inductance Lmax when the wheel rotates together with the transmitter element opposite the coil with the soft-magnetic core. Sections in the temporal profile of the inductance in which the inductance does not change or in which the gradient is equal to zero then mark a standstill of the wheel.

In the case of the speed measurement device as well, the soft-magnetic core may have a permanent magnet on an end pointing away from the ferromagnetic transmitter element.

In the case of the speed measurement device,
  a) the at least one coil may be connected in a parallel or series resonant circuit and the evaluation circuit may be configured such that it records the inductance L of the at least one coil depending on the resonant frequency of the resonant circuit, or
  b) means for applying an electrical pulse to the at least one coil may be provided, which means apply an electrical pulse to the at least one coil, wherein the evaluation circuit may then be configured such that the inductance L of the at least one coil is recorded depending on the response of the at least one coil to the electrical pulse, or
  c) means for applying a constant frequency to the at least one coil may be provided, which means apply a constant frequency to the at least one coil, and the evaluation circuit may be configured such that it then records the inductance L of the at least one coil.

The vehicle may furthermore have a plurality of wheels each having an inductive speed sensor as wheel speed sensor on at least two wheels, wherein the evaluation circuit may be configured such that it determines the presence of forward travel or reverse travel of the vehicle on the basis of at least one temporal phase offset between temporal profiles of the inductances L recorded by way of the wheel speed sensors of the at least two wheels.

The evaluation circuit may then in particular be configured such that it,
a) starting from recorded travel of the vehicle, stores at least one first temporal phase offset between first temporal profiles of the inductances L recorded by the wheel speed sensors of the at least two wheels up to a recorded standstill of the vehicle, and then,
b) after recorded resumption of travel of the vehicle, records at least one second temporal phase offset between second temporal profiles of the inductances L recorded by the wheel speed sensors of the at least two wheels and compares it with the at least one first temporal phase offset, and when it establishes in the process that
c) the at least one second temporal phase offset has a significant deviation from the at least one first temporal phase offset, concludes as to a reversal of the direction of travel from forward travel to reverse travel or from reverse travel to forward travel, but if it
d) on the other hand establishes that a merely insignificant deviation of the at least one second temporal phase offset from the at least one first temporal phase offset is present, concludes as to a continuation of the direction of travel, forward travel or reverse travel.

Concluding as to a reversal of the direction of travel from forward travel to reverse travel or from reverse travel to forward travel or concluding as to a continuation of the direction of travel, forward travel or reverse travel, may contain generating a corresponding signal by way of the electronic evaluation circuit that is then provided for example to a driver assistance system for further processing.

Recording the travel or the resumption of travel of the vehicle may be determined by the electronic evaluation circuit through a temporal change in the inductance L.

In the case of the speed measurement device, the evaluation circuit may furthermore be configured such that it interprets it to be a significant deviation between the at least one second temporal phase offset from the at least one first temporal phase offset when it establishes that the at least one second temporal phase offset is inverted with respect to the at least one first temporal phase offset. Such an inversion means for example that when, in the travel of the vehicle, a maximum or a minimum of the temporal profile of the inductance L of a first wheel speed sensor was leading a maximum or a minimum of the temporal profile of the inductance L of a second wheel speed sensor in time, this lead reverses to a lag when the vehicle resumes travel, that is to say that the maximum or the minimum of the temporal profile of the inductance L of the first wheel speed sensor then lags the maximum or the minimum of the temporal profile of the inductance L of the second wheel speed sensor in time. Reference is made to the above explanations in order to explain this effect.

In the case of the speed measurement device, the evaluation circuit may also be configured such that it records a standstill of the vehicle by virtue of the fact that it identifies a section in the temporal profile of the inductance L in which the gradient of the profile of the inductance L is substantially equal to zero.

The invention also relates to a driver assistance system having at least one speed measurement device described above. In the case of such a driver assistance system, reliable recording of the speed of zero or of the vehicle standstill may in particular be meaningful, as is the case for example with a driver assistance system that contains an auto hold function and/or a hill start assist function.

The invention likewise includes a vehicle having such a driver assistance system.

One exemplary embodiment of the invention is illustrated below in the drawing and explained in more detail in the following description.

DETAILED DESCRIPTION

Figure 1:
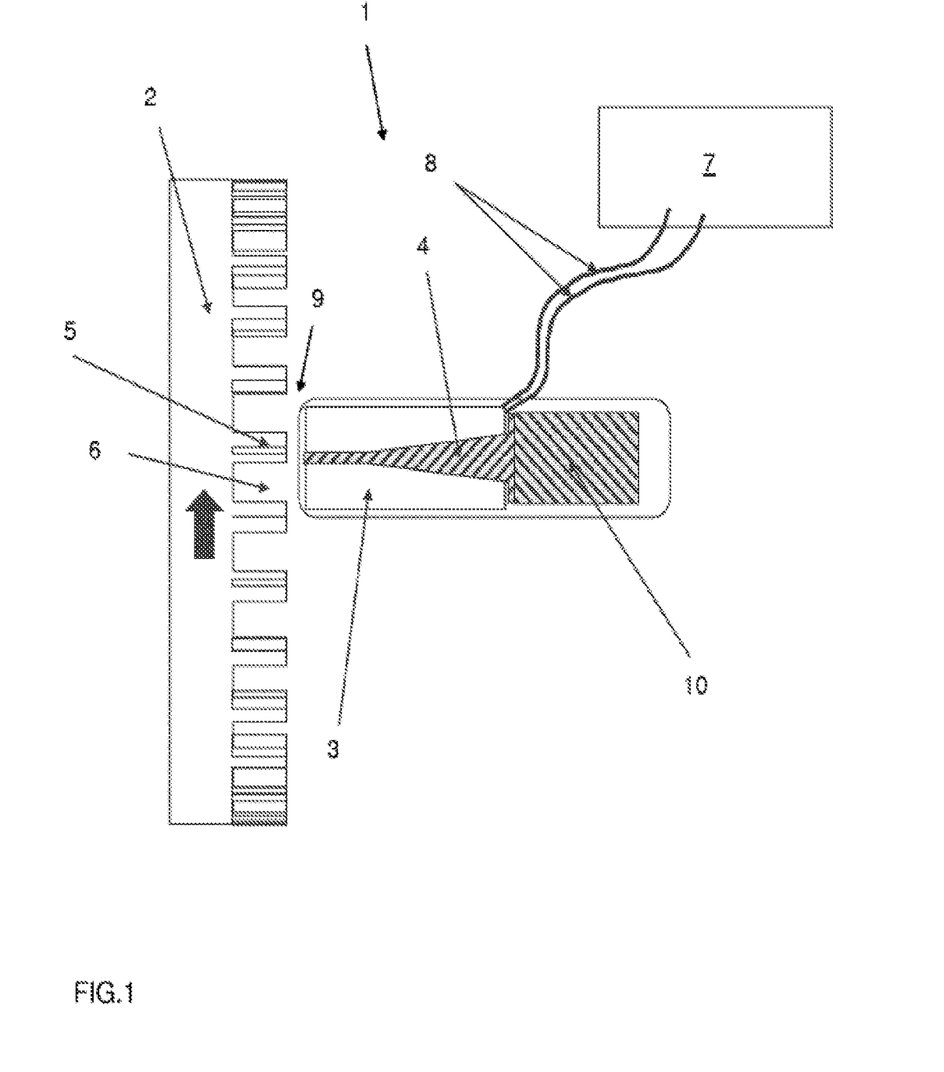
FIG. 1 shows a schematic illustration of a wheel speed measurement device as an exemplary embodiment of a speed measurement device of the invention.

FIG. 1 is a schematic illustration of a wheel speed sensor 1 as an exemplary embodiment of a speed measurement device of the invention. The wheel speed sensor 1 is configured as a passive inductive speed sensor and comprises a ferromagnetic transmitter element (encoder) 2 that is configured for example in the shape of a ring and rotates together with a wheel of the vehicle coaxially with respect to the wheel axis. The wheel speed sensor 1 furthermore comprises a stationary coil 3 and a soft-magnetic core 4, wherein the coil 3 surrounds the soft-magnetic core 4 and a common center axis of the coil 3 and of the soft-magnetic core 4 is arranged parallel to the wheel axis and perpendicular to a plane that is also perpendicular to the wheel axis.

The ferromagnetic transmitter element 2 has alternately protruding teeth 5 and tooth gaps 6. The wheel speed sensor 1 also comprises an electronic evaluation circuit 7 that is connected to the coil 3 by lines 8. A slight gap 9 is formed between the ferromagnetic transmitter element 2 and an end of the soft-magnetic core 4 pointing toward said transmitter element. A permanent magnet 10 is arranged on that end of the soft-magnetic core 4 pointing away from the ferromagnetic transmitter element 2. The magnetic field of the permanent magnet 10 on one side penetrates the soft-magnetic core 4, the coil 3 and also the ferromagnetic transmitter element 2 at least in places.

If the ferromagnetic transmitter element 2 rotates with respect to the stationary unit consisting of the coil 3 and the soft-magnetic core 4, that is to say if the wheel, provided with the wheel speed sensor 1, of the vehicle rotates, then firstly the inductance L of the coil 3 and a voltage U induced in the coil 3 changes as a result of the alternately extending and retracting teeth 5 and tooth gaps 6 in the region of the gap 9.

On the one hand, a voltage U is induced in the coil 3 and therefore also in the lines 8 due to the law of induction, which voltage is proportional to the temporal change of the magnetic flux Φ. Depending on the induced voltage U, the (rotational) speed of the ferromagnetic transmitter element 2 and thus of the wheel may then be determined in the electronic evaluation circuit 7. In this case, the magnetic flux Φ depends on whether a tooth 5 or a tooth gap 6 is opposite that end of the soft-magnetic core 4 facing the ferromagnetic transmitter element 2. A tooth 5 bundles the stray flux of the permanent magnet 10, but a tooth gap 6 attenuates the magnetic flux. If the wheel of the vehicle therefore rotates together with the ferromagnetic transmitter element 2, then a magnetic field change is brought about by each tooth 5. This change in the magnetic field generates the induction voltage U in the coil 3. The number of pulses per time unit is then a measure of the wheel speed of the wheel.

The electronic evaluation circuit 7 is therefore firstly configured such that it records a change in the voltage U induced in the coil 3 and determines the (rotational) speed of the wheel on the basis of the changed voltage U induced in the coil 3.

On the other hand, the inductance L of the coil 3 is periodically changed in the event of a rotation of the wheel and therefore of the ferromagnetic transmitter element 2. Depending on whether a tooth 5 or a tooth gap 6 is opposite the soft-magnetic core 4, the inductance L of the coil 3 changes.

The electronic evaluation circuit 7 is therefore also configured such that it also records a change in the inductance L of the coil 3 and determines the (rotational) speed of the wheel on the basis of the changed inductance L of the coil 3.

In this case, various recording methods are conceivable. By way of example, the coil 3 may be connected in a parallel or series resonant circuit and the evaluation circuit may be configured such that it records the inductance L of the coil 3 depending on the resonant frequency of the resonant circuit. As an alternative, means for applying an electrical pulse to the coil 3 may be provided, which means apply an electrical pulse to the coil 3, wherein the evaluation circuit 7 is then for example configured such that it records the inductance L of the coil 3 depending on the response of the coil 3 to the electrical pulse. Last but not least, means for applying a constant frequency to the coil 3 may also be provided, which means apply a constant frequency to the coil 3, wherein the evaluation circuit 7 is then configured such that it records the inductance L of the coil 3.

Figure 2:
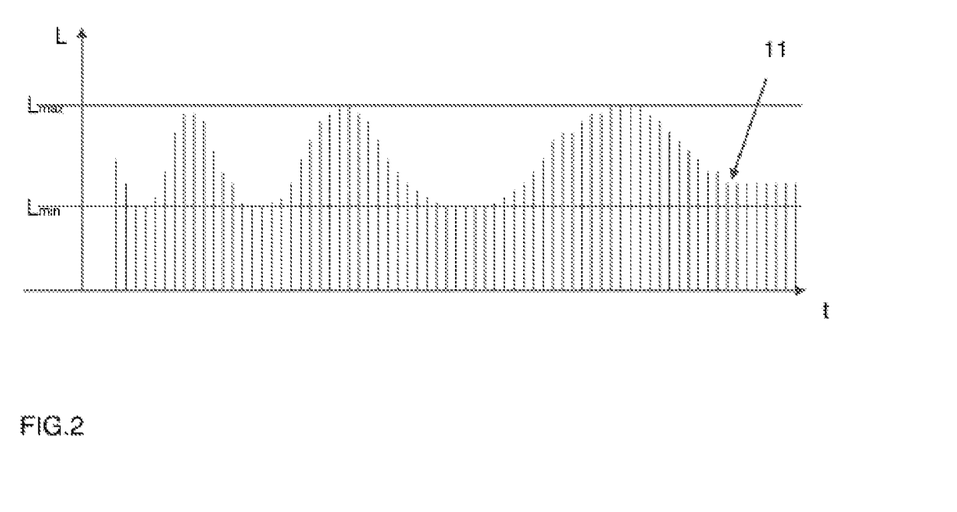
FIG. 2 shows a graph that illustrates the temporal profile of the inductance L recorded by the wheel speed measurement device according to FIG. 1 over time t.

FIG. 2 shows a graph that illustrates the temporal profile of the inductance L recorded by the wheel speed sensor 1 according to FIG. 1 over time t. As is able to be seen here, a periodic profile of the inductance L in this case arises that moves approximately sinusoidally between a maximum value Lmax and a minimum value Lmin, wherein the maximum values Lmax are adopted when a tooth 5 of the ferromagnetic transmitter element 2 is opposite the soft-magnetic core 4 and the minimum values Lmin are adopted when a tooth gap 6 is opposite the soft-magnetic core 4.

Sections or areas, identified by the arrow 11 in FIG. 2, in which the inductance L does not change and/or the gradient of the temporal profile of the inductance L is substantially equal to zero, are identified by the electronic evaluation circuit 7 as a standstill of the wheel.

The electronic evaluation circuit 7 is furthermore configured such that it records the change in the inductance L of the coil 3 and determines the (rotational) speed of the wheel on the basis of the changed inductance L of the coil 3 only until the determined speed has reached a speed limit value starting from lower speeds, for example starting from a standstill. This speed limit value may be relatively low.

The evaluation circuit 7 is furthermore configured such that, when the speed determined thereby has exceeded the speed limit value starting from lower speeds, for example in the case of an acceleration of the vehicle, it records the change in the voltage U induced in the coil 3 and then no longer determines the speed on the basis of the change in the inductance L, but rather only on the basis of the changed voltage U. If the speed determined by the evaluation circuit 7 has then reached or dropped below the speed limit value again starting from higher speeds, that is to say for example when the traveling vehicle is braked, then a change in the inductance L of the at least one coil 3 is again recorded and the speed is then no longer determined on the basis of the change in the induced voltage U, but rather on the basis of the changed inductance L of the coil 3.

The vehicle has for example four wheels A, B, C, D (FIGS. 3 and 4) each having a dedicated inductive speed sensor as wheel speed sensor 1. The presence of forward travel or reverse travel of the vehicle is then determined on the basis of at least one temporal phase offset between temporal profiles of the inductances L recorded by way of the wheel speed sensors on for example two wheels A and B by the electronic evaluation circuit 7. In other words, the presence of forward travel or reverse travel of the vehicle is determined on the basis of at least one temporal phase offset of the temporal profiles of the inductances L recorded by the wheel speed sensors 1 of at least two different wheels of the vehicle.

This forward travel/reverse travel recognition is now intended to be explained in more detail with reference to the graphs of FIG. 3 and FIG. 4, which each illustrate the temporal profile of the inductances L, recorded by four wheel speed sensors, of four wheels A, B, C and D of the vehicle over time t. In this case, a dedicated wheel speed sensor 1 records the (rotational) speed or the wheel speed for each wheel A, B, C and D. A denotes the first wheel, B denotes the second wheel, C denotes the third wheel and D denotes the fourth wheel of the vehicle.

It is assumed in this case by way of example that the electronic evaluation circuits 7 of the four wheel speed sensors are combined in an integrated electronic evaluation circuit 7 and that forward travel, reverse travel and also standstill recognition is implemented in the integrated electronic evaluation circuit 7.

Starting from travel, recorded by the wheel speed sensors 1, of the vehicle, for example in the case of forward travel at a speed that is for example lower than the speed limit value, a first temporal phase offset Δt1 between first temporal profiles of the inductances L for example of the two wheel speed sensors 1 of the first wheel A and of the second wheel B up to a recorded standstill of the vehicle is stored. The first temporal profiles of the inductances L of the wheel speed sensors 1 of all four wheels A to D are illustrated on the left in FIG. 3. It is apparent from FIG. 3 that, in the case of forward travel, the first temporal profiles of the inductances L of the four wheel speed sensors of the four wheels A to D each have a phase offset with respect to one another.

Figure 3:
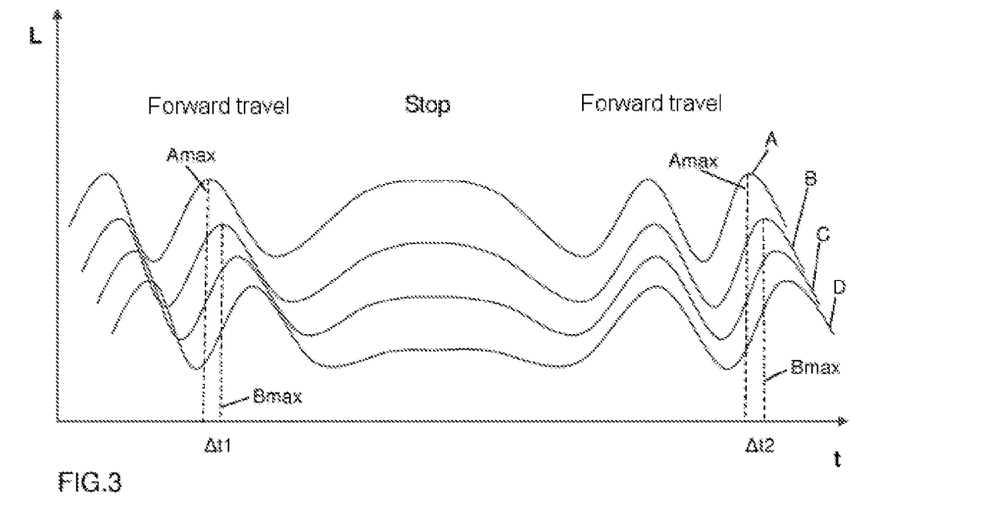
FIG. 3 shows a graph that illustrates the temporal profile of the inductances L recorded by wheel speed measurement devices on four wheels of a vehicle over time t in the case of travel in a single direction of travel with an intermediate stop.
Figure 4:
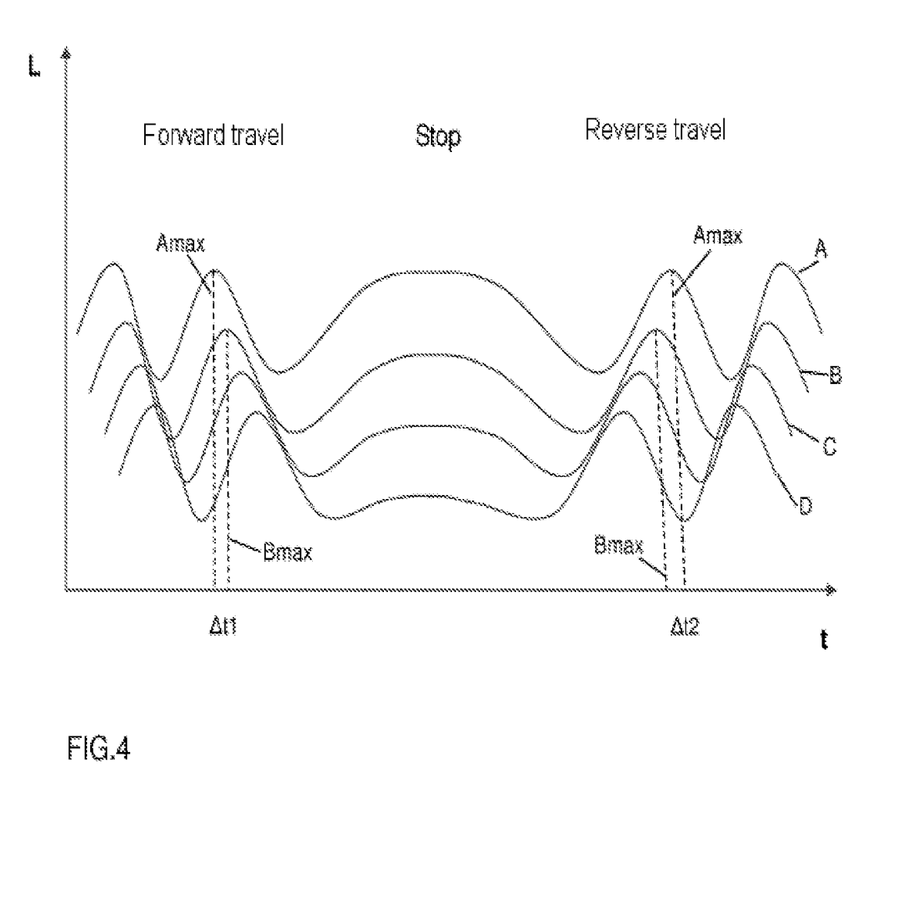
FIG. 4 shows a graph that illustrates the temporal profile of the inductances L recorded by wheel speed measurement devices on four wheels of a vehicle over time t in the case of travel in one direction of travel and an intermediate stop later in the opposite direction of travel.

By way of example, in FIG. 3, the first temporal phase offset Δt1 between the inductance profile recorded by the wheel speed sensor 1 of the first wheel A and the inductance profile recorded by the wheel speed sensor 1 of the second wheel B is shown between the amplitude maxima Amax and Bmax. As an alternative, this first temporal phase offset Δt1 could also be determined between any corresponding values of the inductance profile recorded by the wheel speed sensor 1 of the first wheel A and the induction profile recorded by the wheel speed sensor 1 of the second wheel B. In the case of forward travel, the profile of the inductance L at the first wheel A therefore leads the profile of the inductance L at the second wheel B by the first temporal phase offset Δt1, as is apparent on the left in FIG. 3.

It is then assumed that the vehicle is braked starting from forward travel to a standstill (stop), this being recognized by the integrated electronic evaluation circuit 7 for example by virtue of the fact that the temporal profiles of the inductances L recorded by the wheel speed sensors of all four wheels A to D each have a gradient of zero and/or the inductances L do not change or remain constant, this being shown by way of illustration roughly in the middle of FIG. 3.

Following resumption of travel of the vehicle, recorded by the integrated electronic evaluation circuit 7, from the recorded vehicle standstill, a second temporal phase offset Δt2 between second temporal profiles of the inductances L of the wheel speed sensors 1 of the first wheel A and of the second wheel B is then recorded. These second temporal profiles of the inductances L of the wheel speed sensors 1 of the two wheels A and B and the second temporal phase offset Δt2 are each illustrated on the right in FIG. 3 and in FIG. 4.

In the same way as for the first temporal phase offset Δt1, the second temporal phase offset Δt2 is likewise here for example specified between the amplitude maxima Amax and Bmax of the second temporal profiles of the inductances L of the wheel speed sensors 1 of the first wheel A and of the second wheel B.

The second temporal phase offset Δt2 is then compared with the first temporal phase offset Δt2. If the integrated electronic evaluation circuit 7 establishes in the process that the second temporal phase offset Δt2 has a significant deviation from the first temporal phase offset Δt1, then it concludes as to a reversal of the direction of travel from forward travel to reverse travel.

It is interpreted to be a significant deviation of the second temporal phase offset Δt2 from the first temporal phase offset Δt1 for example when the second temporal phase offset Δt2 is inverted with respect to the first temporal phase offset Δt1. This situation is illustrated in FIG. 4. In the temporal profiles of the inductances L of the four wheels A to D as illustrated on the left in FIG. 4, in the case of forward travel, as in the forward travel on the left in FIG. 3, the profile of the inductance L at the first wheel A leads the profile of the inductance L at the second wheel B by the first temporal phase offset Δt1. In the resumption of travel shown on the right in FIG. 4, beginning after the standstill of the vehicle, the conditions are however reversed, that is to say that the profile of the inductance L at the first wheel A no longer leads the profile of the inductance L at the second wheel B by the first temporal phase offset Δt1 but rather, by contrast, lags it by the second temporal phase offset Δt2. As a result, a reversal of the direction of travel of the vehicle from forward travel to reverse travel took place after the intermediate stop.

If the integrated electronic evaluation circuit 7 however otherwise establishes, in the comparison, that a merely insignificant deviation of the second temporal phase offset Δt2 from the first temporal phase offset Δt1 is present, then it concludes as to a continuation of the forward travel direction of travel. This situation is illustrated on the right in FIG. 3. Here, in the resumption of travel of the vehicle, beginning after the standstill of the vehicle, the profile of the inductance L at the first wheel A leads the profile of the inductance L at the second wheel B, in the same way as before the intermediate stop, by the second temporal phase offset Δt2, which is for example identical in comparison with the first temporal phase offset Δt1. As a result, there is no significant deviation here of the second temporal phase offset Δt2 from the first temporal phase offset Δt1.

Concluding as to a reversal of the direction of travel from forward travel to reverse travel or from reverse travel to forward travel or concluding as to a continuation of the direction of travel, forward travel or reverse travel, may contain generating a corresponding signal by way of the integrated electronic evaluation circuit 7 that is then provided for example to a driver assistance system for further processing. Such a driver assistance system is in particular a driver assistance system having an auto hold function or hill start assist function in the case of which it is important to establish the vehicle standstill or the vehicle starting to travel or setting off in a detected direction.

The List of reference signs is as follows:
1 wheel speed sensor
2 transmitter element
3 coil
4 core
5 teeth
6 tooth gap
7 evaluation circuit
8 lines
9 gap
10 permanent magnet
11 arrow
A first wheel
B second wheel
C third wheel
D fourth wheel
U induced voltage
L inductance
Δt1 first temporal phase offset
Δt2 second temporal phase offset

The invention claimed is:

1. A method for determining a speed using a measurement sensor in a vehicle, the measurement sensor including at least one coil and a ferromagnetic transmitter element, the method comprising:
   changing the inductance of the at least one coil and the voltage induced in the at least one coil, using an inductive speed sensor having at least the coil and the ferromagnetic transmitter element;
   recording the change in the inductance of the at least one coil, and determining the speed based on a changed inductance of the at least one coil;
   wherein the change in the inductance of the at least one coil is recorded and the speed is determined based on the changed inductance of the at least one coil only until the determined speed has reached a speed limit value starting from lower speeds,
   wherein a change in the voltage induced in the at least one coil is recorded and the speed is determined based on the changed voltage when the determined speed has exceeded the speed limit value starting from lower speeds, and
   wherein a change in the inductance of the at least one coil is recorded and the speed is determined based on the changed inductance of the at least one coil when the determined speed has reached or dropped below the speed limit value starting from higher speeds.

2. The method of claim 1, wherein:
(i) the at least one coil is connected in a parallel or series resonant circuit, so that the inductance of the at least one coil is recorded depending on the resonant frequency of the resonant circuit, or
(ii) an electrical pulse is applied to the at least one coil, so that the inductance of the at least one coil is recorded depending on the response of the at least one coil to the electrical pulse, or
(iii) a constant frequency is applied to the at least one coil, so that the inductance of the at least one coil is then recorded.

3. The method of claim 1, wherein the vehicle has a plurality of wheels each having an inductive speed sensor as wheel speed sensor on at least two wheels, and wherein a presence of forward travel or reverse travel of the vehicle is determined based on at least one temporal phase offset of the temporal profiles of the inductances recorded by the wheel speed sensors of the at least two wheels.

4. The method of claim 3, wherein:
1) starting from recorded travel of the vehicle, at least one first temporal phase offset between first temporal profiles of the inductances recorded by the wheel speed sensors of the at least two wheels up to a recorded standstill of the vehicle is stored,
2) after recorded resumption of travel of the vehicle, at least one second temporal phase offset between second temporal profiles of the inductances recorded by the wheel speed sensors of the at least two wheels is recorded and compared with the at least one first temporal phase offset,
3) when it is established in the process that the at least one second temporal phase offset has a significant deviation from the at least one first temporal phase offset, a reversal of the direction of travel from forward travel to reverse travel or from reverse travel to forward travel is concluded, and
4) if it is established that a merely insignificant deviation of the at least one second temporal phase offset from the at least one first temporal phase offset is present, a continuation of the direction of travel, forward travel or reverse travel, is concluded.

5. The method of claim 4, wherein it is interpreted to be a significant deviation of the at least one second temporal phase offset from the at least one first temporal phase offset when the at least one second temporal phase offset is inverted with respect to the at least one first temporal phase offset, and wherein a temporal lead of the first profile of the inductance recorded by the wheel speed sensor of a first wheel of the at least two wheels with respect to the first profile of the inductance recorded by the wheel speed sensor of a second wheel of the at least two wheels by the first temporal phase offset changes to a temporal lag of the second profile of the inductance recorded by the wheel speed sensor of the first wheel of the at least two wheels with respect to the second profile of the inductance recorded by the wheel speed sensor of the second wheel of the at least two wheels by the second temporal phase offset.

6. The method of claim 4, wherein a standstill of the vehicle is recorded by identifying a section in the temporal profile of the inductance in which the inductance does not change and/or the gradient of the temporal profile of the inductance is substantially equal to zero.

7. A speed measurement device for determining a speed in a vehicle using a measurement sensor, which includes at least one coil and a ferromagnetic transmitter element, by changing the inductance of the at least one coil and the voltage induced in the at least one coil, comprising:
at least one inductive speed sensor, including: the at least one coil;
the ferromagnetic transmitter element; and
an evaluation circuit;
wherein the evaluation circuit is configured to record a change in the inductance of the at least one coil and to determine the speed based on the changed inductance of the at least one coil,
wherein the evaluation circuit is further configured to perform the following:
recording the change in the inductance of the at least one coil, and determining the speed based on the changed inductance of the at least one coil only until the determined speed has reached a speed limit value starting from lower speeds,
recording a change in the voltage induced in the at least one coil when the determined speed has exceeded the speed limit value starting from lower speeds, and determining the speed based on the changed voltage, and
recording a change in the inductance of the at least one coil when the determined speed has reached or dropped below the speed limit value starting from higher speeds, and determining the speed based on the changed inductance of the at least one coil.

8. The speed measurement device of claim 7, wherein the speed measurement device includes a wheel speed measurement device and the inductive speed sensor includes a wheel speed sensor.

9. The speed measurement device of claim 7, wherein the ferromagnetic transmitter element has alternately protruding teeth and tooth gaps.

10. The speed measurement device of claim 7, wherein the at least one coil surrounds a soft-magnetic core.

11. The speed measurement device of claim 10, wherein the soft-magnetic core includes a permanent magnet on an end pointing away from the ferromagnetic transmitter element.

12. The speed measurement device of claim 7, further comprising at least one of:
a circuit in which the at least one coil is connected in a parallel or series resonant circuit and the evaluation circuit is configured to record the inductance of the at least one coil depending on the resonant frequency of the resonant circuit, and/or
a means for applying an electrical pulse to the at least one coil, which applies an electrical pulse to the at least one coil, wherein the evaluation circuit is configured to record the inductance of the at least one coil depending on the response of the at least one coil to the electrical pulse, and/or
a means for applying a constant frequency to the at least one coil, which applies a constant frequency to the at least one coil, and the evaluation circuit is configured so that it records the inductance of the at least one coil.

13. The speed measurement device of claim 7, wherein the vehicle has a plurality of wheels each having an inductive speed sensor as wheel speed sensor on at least two wheels, wherein the evaluation circuit is configured to determine a presence of forward travel or reverse travel of the vehicle based on at least one temporal phase offset between the temporal profiles of the inductances recorded by the wheel speed sensors of the at least two wheels.

14. The speed measurement device of claim 13, wherein the evaluation circuit is configured to perform the following:
storing, starting from recorded travel of the vehicle, at least one first temporal phase offset between first temporal profiles of the inductances recorded by the wheel speed sensors of the at least two wheels up to a recorded standstill of the vehicle, and
recording, after recorded resumption of travel of the vehicle, at least one second temporal phase offset between second temporal profiles of the inductances recorded by the wheel speed sensors of the at least two wheels and comparing it with the at least one first temporal phase offset,
wherein if it is established that the at least one second temporal phase offset has a significant deviation from the at least one first temporal phase offset, concluding as to a reversal of the direction of travel from forward travel to reverse travel or from reverse travel to forward travel, and/or
wherein if it is established that a merely insignificant deviation of the at least one second temporal phase offset from the at least one first temporal phase offset is present, concluding as to a continuation of the direction of travel, forward travel or reverse travel.

15. The speed measurement device of claim 14, wherein the evaluation circuit is configured to interpret it to be a significant deviation of the at least one second temporal phase offset from the at least one first temporal phase offset when it establishes that the at least one second temporal phase offset is inverted with respect to the at least one first temporal phase offset, wherein a temporal lead of the first profile of the inductance recorded by the wheel speed sensor of a first wheel of the at least two wheels with respect to the first profile of the inductance recorded by the wheel speed sensor of a second wheel of the at least two wheels by the first temporal phase offset changes to a temporal lag of the second profile of the inductance recorded by the wheel speed sensor of the first wheel of the at least two wheels with respect to the second profile of the inductance recorded by the wheel speed sensor of the second wheel of the at least two wheels by the second temporal phase offset.

16. The speed measurement device of claim 13, wherein the evaluation circuit is configured to record a standstill of the vehicle by identifying a section in the temporal profile of the inductance in which the inductance does not change and/or in which the gradient of the profile of the inductance is substantially equal to zero.

17. A driver assistance system, comprising:
at least one speed measurement device for determining a speed in a vehicle using a measurement sensor, which includes at least one coil and a ferromagnetic transmitter element, by changing the inductance of the at least one coil and the voltage induced in the at least one coil, including:
at least one inductive speed sensor, including:
the at least one coil;
the ferromagnetic transmitter element; and
an evaluation circuit;
wherein the evaluation circuit is configured to record a change in the inductance of the at least one coil and to determine the speed based on the changed inductance of the at least one coil,
wherein the evaluation circuit is further configured to perform the following:
recording the change in the inductance of the at least one coil, and determining the speed based on the changed inductance of the at least one coil only until the determined speed has reached a speed limit value starting from lower speeds,
recording a change in the voltage induced in the at least one coil when the determined speed has exceeded the speed limit value starting from lower speeds, and determining the speed based on the changed voltage, and
recording a change in the inductance of the at least one coil when the determined speed has reached or dropped below the speed limit value starting from higher speeds, and determining the speed based on the changed inductance of the at least one coil.

18. The driver assistance system of claim 17, wherein the driver assistance system includes an auto hold function and/or a hill start assist function.

19. A vehicle, comprising:
a driver assistance system, including:
at least one speed measurement device for determining a speed in a vehicle using a measurement sensor, which includes at least one coil and a ferromagnetic transmitter element, by changing the inductance of the at least one coil and the voltage induced in the at least one coil, including: at least one inductive speed sensor, including:
the at least one coil;
the ferromagnetic transmitter element; and
an evaluation circuit;
wherein the evaluation circuit is configured to record a change in the inductance of the at least one coil and to determine the speed based on the changed inductance of the at least one coil,
wherein the evaluation circuit is further configured to perform the following:
recording the change in the inductance of the at least one coil, and determining the speed based on the changed inductance of the at least one coil only until the determined speed has reached a speed limit value starting from lower speeds,
recording a change in the voltage induced in the at least one coil when the determined speed has exceeded the speed limit value starting from lower speeds, and determining the speed based on the changed voltage, and
recording a change in the inductance of the at least one coil when the determined speed has reached or dropped below the speed limit value starting from higher speeds, and determining the speed based on the changed inductance of the at least one coil.

* * * * *